(12) United States Patent
Jeong et al.

(10) Patent No.: US 11,926,107 B2
(45) Date of Patent: Mar. 12, 2024

(54) DISPLAY PROTECTOR ATTACHMENT APPARATUS FOR FOLDABLE ELECTRONIC DEVICE AND DISPLAY PROTECTOR ATTACHMENT KIT FOR FOLDABLE ELECTRONIC DEVICE

(71) Applicant: WHITESTONE CO., LTD., Chungcheongnam-do (KR)

(72) Inventors: Jae Yong Jeong, Chungcheongnam-do (KR); Jin Ho Seok, Gyeonggi-do (KR)

(73) Assignee: WHITESTONE CO., LTD., Chungcheongnam-do (KR)

( * ) Notice: Subject to any disclaimer, the term of this patent is extended or adjusted under 35 U.S.C. 154(b) by 0 days.

(21) Appl. No.: 17/864,384

(22) Filed: Jul. 13, 2022

(65) Prior Publication Data

US 2023/0014521 A1 Jan. 19, 2023

(30) Foreign Application Priority Data

Jul. 15, 2021 (KR) .................. 10-2021-0093138

(51) Int. Cl.
*B29C 65/00* (2006.01)
*B29C 65/78* (2006.01)
*B32B 43/00* (2006.01)

(52) U.S. Cl.
CPC ...... *B29C 65/7802* (2013.01); *B29C 65/7841* (2013.01); *B29C 66/82* (2013.01);
(Continued)

(58) Field of Classification Search
CPC ............. B32B 43/006; Y10T 156/1195; Y10T 156/1994; B29C 65/7802; B29C 65/7808; B29C 65/7814; B29C 66/8362
See application file for complete search history.

(56) References Cited

U.S. PATENT DOCUMENTS

2013/0299075 A1* 11/2013 Colby ..................... C09J 7/403
428/41.7
2014/0338829 A1 11/2014 Peng et al.
(Continued)

FOREIGN PATENT DOCUMENTS

CN 213082357 4/2021
JP H0557070 3/1993
(Continued)

OTHER PUBLICATIONS

"Office Action of Korea Counterpart Application" with English translation thereof, dated Jun. 28, 2022, p. 1-p. 15.
(Continued)

*Primary Examiner* — Philip C Tucker
*Assistant Examiner* — Nickolas R Harm
(74) *Attorney, Agent, or Firm* — JCIPRNET (57) ABSTRACT

A display protector attachment apparatus for a foldable electronic device according to the present disclosure includes: a frame unit including a frame-first end member at one end and a frame-second end member at another end and configured to support and accommodate the foldable electronic device between the frame-first end member and the frame-second end member; and an inclination-forming fixing unit connected to the frame-second end member and configured to align a protector film assembly to be arranged inclinedly with respect to the foldable display unit of the foldable electronic device by varying mounting heights for both ends of the protector film assembly including a display protector that is to be attached to the foldable electronic device.

9 Claims, 8 Drawing Sheets

(52) U.S. Cl.
CPC .......... *B29C 66/836* (2013.01); *B29C 66/861* (2013.01); B29C 65/7808 (2013.01); B29C 65/7814 (2013.01); B29C 66/8362 (2013.01); B32B 43/006 (2013.01); Y10T 156/1195 (2015.01); Y10T 156/1994 (2015.01)

(56) References Cited

U.S. PATENT DOCUMENTS

| | | | |
|---|---|---|---|
| 2020/0064883 A1 | 2/2020 | Schwenke |
| 2020/0230868 A1 | 7/2020 | Lin |
| 2020/0368974 A1 | 11/2020 | Choung et al. |
| 2022/0063181 A1 | 3/2022 | Song et al. |

FOREIGN PATENT DOCUMENTS

| | | |
|---|---|---|
| KR | 101838482 | 3/2018 |
| KR | 102015330 | 8/2019 |
| KR | 1020200004951 | 1/2020 |
| KR | 102114926 | 5/2020 |
| KR | 1020200108397 | 9/2020 |
| KR | 102162940 | 10/2020 |
| KR | 200493571 | 4/2021 |
| KR | 1020210079124 | 6/2021 |

OTHER PUBLICATIONS

"Office Action of Korea Counterpart Application", dated Nov. 17, 2022, with English translation thereof, p. 1-p. 16.
"Search Report of Europe Counterpart Application", dated Dec. 20, 2022, p. 1-p. 18.
Office Action of Taiwan Counterpart Application, with English translation thereof, dated Mar. 21, 2023, pp. 1-11.
"Notice of Reasons for Refusal of Japan Counterpart Application", dated Jun. 20, 2023, with English translation thereof, p. 1-p. 7.

\* cited by examiner

DISPLAY PROTECTOR ATTACHMENT APPARATUS FOR FOLDABLE ELECTRONIC DEVICE AND DISPLAY PROTECTOR ATTACHMENT KIT FOR FOLDABLE ELECTRONIC DEVICE

CROSS-REFERENCE TO RELATED APPLICATION

This application is based on and claims priority under 35 U.S.C. § 119 to Korean Patent Application No. 10-2021-0093138, filed on Jul. 15, 2021, in the Korean Intellectual Property Office, the disclosure of which is incorporated by reference herein in its entirety.

BACKGROUND

1. Field

One or more embodiments relate to an attachment apparatus for attaching a protector, which is for protecting a display unit of a foldable electronic device, to a display unit of a foldable electronic device and a display protector attachment kit including the display protector attachment apparatus. More particularly, one or more embodiments relate to a protector attachment apparatus that enables simple and accurate attachment of a protector, which is for protecting a display unit of an electronic device in which a display unit may fold, to a display unit and a display protector attachment kit including the protector attachment apparatus.

2. Description of the Related Art

Recently, electronic devices, such as smart devices and mobile devices, have become expensive products and have a display unit on the front, and accordingly, a structure in which a cover glass is applied to the front surface of a display unit to protect a touch panel is provided.

However, the cover glass has a high risk of damage or breakage due to factors including physical impact or dropping. When the cover glass needs to be repaired due to damage or breakage, the repair costs are considerable compared to the original selling price of an electronic device, and a considerable amount of time is required for the repair. In addition, such a damaged cover glass has a sharp surface, and thus, a user may be injured or operation of an electronic device itself may be poor. However, in spite of the aforementioned damage risk and inconvenience due to the high repair costs in case the cover glass of the electronic device is damaged or broken, a user frequently continues to use the electronic device having the broken cover glass and often ignores minor damage such as scratches. Therefore, an improved method for a typical consumer to easily attach a protective glass or protective film to a display of a smart device is required. However, there are often cases where a protective glass or protective film is not attached in the correct position on a display of an electronic device in the process of attaching a protective glass or protective film to a display of an electronic device or dust ends up between a display of an electronic device and a protective glass or protective film during the attachment process. To overcome these problems, there is a need for a typical consumer to easily attach a protective glass or protective film directly to a display unit of an electronic device.

To meet this need, an attachment apparatus for attaching a display protector, such as a protective glass or protective film, only for an electronic device having a non-folding flat-type display unit has been developed.

However, as an electronic device of which a display unit is foldable has recently been developed, it has become necessary to attach a protective glass or protective film (collectively referred to as a "protector") also to a display unit of such a foldable electronic device. In the case of a foldable display unit, a recess is formed in the foldable area, and thus, in attaching a protector to a surface of the foldable display unit including the recess, a protector attachment apparatus for a non-folding display unit in the art is not suitable.

PRIOR ART

Patent Document (Patent document 0001) KR 10-2114926, published on May 19, 2020

SUMMARY

One or more embodiments include a display protector attachment apparatus for a foldable electronic device and a display protector attachment kit including the same, wherein the display protector attachment apparatus is configured to facilitate accurate alignment of a display protector for a foldable electronic device of which a display unit is foldable.

One or more embodiments include a display protector attachment apparatus for a foldable electronic device and a display protector attachment kit including the same, wherein the display protector attachment apparatus is configured to enable a display protector for a foldable electronic device of which a display unit is foldable to be attached in close contact with a recess of a folding line of the foldable display unit of the foldable electronic device.

Additional aspects will be set forth in part in the description which follows and, in part, will be apparent from the description, or may be learned by practice of the presented embodiments of the disclosure.

According to one or more embodiments, a display protector attachment apparatus for a foldable electronic device including a foldable display unit includes: a frame unit including a frame-first end member at one end and a frame-second end member at another end and configured to support and accommodate the foldable electronic device; an inclination-forming fixing unit connected to the frame-second end member and configured to align a protector film assembly inclinedly with respect to a display unit of a foldable electronic device, wherein mounting heights for both ends of protector film assembly that includes a display protector to be attached to the electronic device are different from each other; and a cover member one end of the protector film assembly to maintain a plane thereof horizontal, wherein the one end is mounted higher than another end of the protector film assembly and connected to the inclination-forming fixing unit.

Here, the frame unit may include at least one first end-first fixing pin and a first end-second fixing pin that are installed on the frame-first end member and protrude upwards, wherein the first end-second fixing pin has a different horizontal cross-section from that of the first end-first fixing pin. The inclination-forming fixing unit may include a pair of second end-side fixing pins installed protruding upwardly from a vertical extension unit member that extends upwardly.

The frame unit may include: a seating surface extending horizontally inward along an inner circumference of a seating space toward the seating space in which the electronic device is placed; and a plurality of support protrusions formed by protruding from a periphery of the seating surface, wherein each of the plurality of support protrusions may be spaced apart at a predetermined interval on the seating surface.

The inclination-forming fixing unit may extend in parallel to the extending direction of a folding recess of the foldable display unit of the foldable electronic device.

The cover member may include a pin through hole formed corresponding to the second end-side fixing pin of the inclination-forming fixing unit.

According to one or more embodiments, a display protector attachment kit includes: the display protector attachment apparatus for the foldable electronic device; and a protector film assembly to be attached to the foldable display unit of the foldable electronic device by the display protector attachment apparatus, wherein the protector film assembly includes a protector body and a release film attached to one surface of the protector body, and the release film includes: a release film-first extension unit formed to extend further than the protector body at one end in a longitudinal direction of the release film; and a release film-second extension unit formed to extend further than the protector body at another end in the longitudinal direction of the release film.

Here, the release film-first extension unit may have a release film-first extension unit-first through hole and a release film-first extension unit-second through hole that respectively have a shape complementary to the horizontal cross-sections of the first end-first fixing pin and the first end-second fixing pin on the frame-first end member of the frame unit and are configured to accommodate the first end-first fixing pin and the first end-second fixing pin, respectively. The release film-second extension unit may have a second extension unit-first through hole configured to accommodate the second end-side fixing pin of the inclination-forming fixing unit.

The release film-second extension unit may further have, on the circumferential surface of the second extension unit-first through hole, an extension unit-first incision line formed extending in a direction opposite to the direction in which the release film-first extension unit is located.

The extension unit-first incision line may be formed in contact with the circumferential surface of the second extension unit-first through hole.

Meanwhile, the extension unit-first incision line may be configured to be opened by the second end-side fixing pin when a tensile force is applied to a body of the release film.

The release film-second extension unit may have a second extension unit-second through hole spaced apart from the second extension unit-first through hole in the longitudinal direction of the release film.

The release film-second extension unit may further have, on the circumferential surface of the second extension unit-second through hole, an extension unit-second incision line formed extending in the direction in which the release film-first extension unit is located.

In addition, the display protector attachment kit may further include a squeeze member configured to apply a force to the protector film assembly to separate the display protector from the release film of the protector film assembly. The squeeze member may include: a blade unit configured to press the protector film assembly against the foldable display of the foldable electronic device and extend in a length corresponding to the width of the foldable display unit of the foldable electronic device; and a wing from a side surface of the squeeze member, arranged at each of both ends of the blade unit to extend from the side surface of the squeeze member, wherein a groove having a width greater than a thickness of the frame side member of the frame unit is in both ends of the blade unit and is between the blade unit and the squeeze member.

A tangent value for the angle of inclination formed by the inclination-forming fixing unit may be in a range of about 40 mm/206.74 mm to about 80 mm/206.74 mm.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Detailed embodiments for conducting the present disclosure will be described with reference to the accompanying drawings. A thickness of lines or size of components shown in the drawings may be exaggerated for clarity and convenience of explanation. In addition, the terms to be described later are defined in consideration of functions in the present disclosure, but may vary according to intentions or customs of a user or an operator. Therefore, definitions of these terms should be understood based on the content described throughout this specification. The terms "first", "second", "one end", and "another end" as used in the present disclosure will be used to distinguish the corresponding components and directions from each other, and do not indicate the importance or operation order or specific direction among the components.

Figure 1:
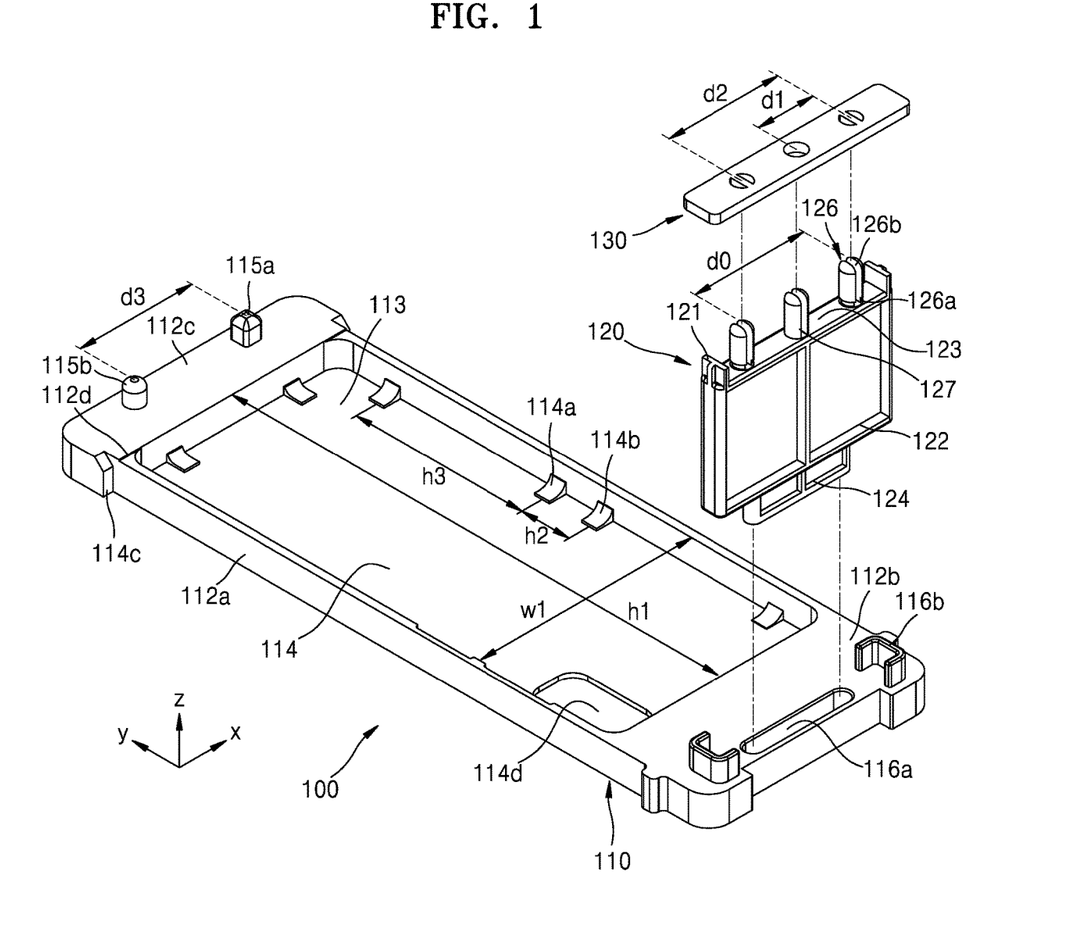
FIG. 1 is an exploded perspective view of a display protector attachment apparatus for a foldable electronic device including a foldable display unit that folds up and down according to an embodiment of the present disclosure.
Figure 2:
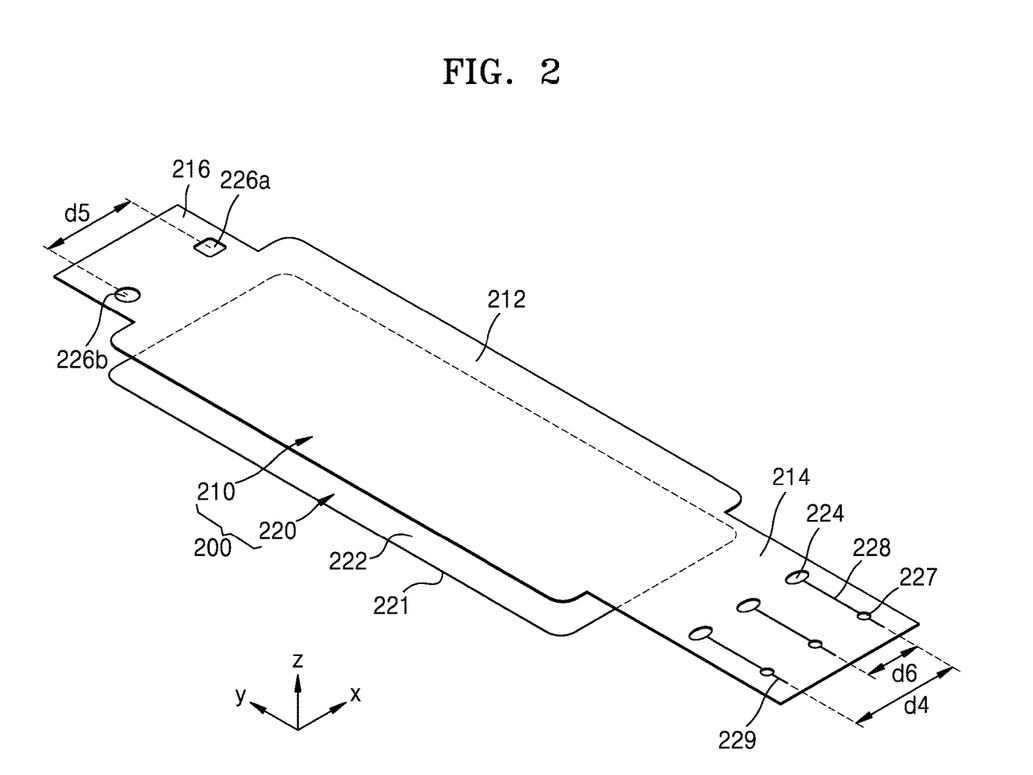
FIG. 2 is an exploded perspective view of a protector film assembly included in a display protector attachment kit for a foldable electronic device including a foldable display unit according to an embodiment of the present disclosure.

FIG. 1 is an exploded perspective view of a display protector attachment apparatus for a foldable electronic device including a foldable display unit that folds up and down according to an embodiment of the present disclosure, and FIG. 2 is an exploded perspective view of a protector film assembly included in a display protector attachment kit for a foldable electronic device including a foldable display unit according to an embodiment of the present disclosure.

As an example of a foldable electronic device having a foldable display unit that folds up and down, a smartphone manufactured by Samsung Electronics (the Galaxy Z Flip®) may be considered. A folding line of the foldable display unit that folds up and down may extend in a traverse direction of the display unit.

Referring to FIG. 1, a display protector attachment apparatus 100 for a foldable electronic device including a foldable display unit according to an embodiment includes a frame unit 110 that includes a frame-first end member 112c at one end and a frame-second end member 112b at another end and that is configured to support and accommodate the foldable electronic device between the frame-first end member 112c and the frame-second end member 112b.

The frame unit 110 may include a frame side member 112a extending between the frame-first end member 112c and the frame-second end member 112b. The frame-first end member 112c, the frame-second end member 112b, and a pair of frame side members 112a facing each other and extending side-by-side between the frame-first end member 112c and the frame-second end member 112b may define a seating space 113, in which a foldable electronic device may be seated in an unfolded state for attachment of a protector film.

A surface of the frame-first end member 112c is formed higher than the frame side member 112a so that a stepped portion 112d may be formed. When a foldable electronic device is placed, the surface of the frame-first end member 112c is higher than a display unit of the foldable electronic device due to the stepped portion 112d, and thus, a squeeze member 150 (see FIG. 5) which will be described later may be able to smoothly proceed in a direction for pushing a protector film assembly 200.

On a bottom surface of the seating space 113, the frame-first end member 112c, the frame-second end member 112b, and the frame side member 112a are in contact to form a seating surface 114. The seating surface 114 may include a camera protrusion-accommodating hole 114d for accommodating a main camera protrusion formed protruding from a case portion arranged on the rear surface of the foldable display unit of the foldable electronic device.

Referring to FIG. 2, a protector film assembly 200 to be included in a display protector attachment kit for a foldable electronic device including a foldable display unit according to an embodiment of the present disclosure may include: a protector body 220 to be attached to the foldable display unit of the foldable electronic device; and a release film 210 arranged on one side of the protector body 220 and supporting the protector body 220. The release film 210 is a temporary member that supports and protects the protector body 220 until the protector body 220 is attached to the foldable display unit of the foldable electronic device, and is a component to be discarded after the protector body 220 is attached to the foldable display unit of the foldable electronic device.

The protector body 220 may be formed to have a predetermined size corresponding to the size of the foldable display unit of the foldable electronic device to which the protector body 220 is attached, and the release film 210 may be attached to an upper surface 222 opposite to a protector attachment surface 221 that is to be attached to the foldable display unit of the foldable electronic device.

The protector body 220 and the release film 210 may be attached to each other by the properties of their materials themselves or by a separate adhesive member, and may be separated from each other when a predetermined force is applied thereto.

The release film 210 may include: a release film body 212 corresponding to the shape of the protector body 220 but having a size slightly larger than the protector body 220; a release film-first extension unit 216 arranged at one end of the release film body 212 and extending further than the protector body 220; and a release film-second extension unit 214 arranged at another end of the release film body 212 and extending further than the protector body 220. The release film 210 may be formed of a material having predetermined flexibility and elasticity.

Referring back to FIG. 1, the display protector attachment apparatus 100 for a foldable electronic device including a foldable display unit according to an embodiment of the present disclosure may include an inclination-forming fixing unit 120 that is connected to the frame-second end member 112b and configured to align the protector film assembly 200 (see FIG. 2) to be inclinedly arranged with respect to the foldable display unit of the foldable electronic device by differentiating mounting heights of both ends of the protector film assembly 200 (i.e., a mounting height of each of the release film-first extension unit 216 and the release film-second extension unit 214 at the both ends of the protector film assembly 200 when the protector film assembly 200 is mounted onto the display protector attachment apparatus 100) including the display protector that is to be attached to the foldable electronic device.

The inclination-forming fixing unit 120 may include a vertical extension unit member 122 that protrudes and extends in a vertical direction (i.e., z direction in the drawing) to increase a mounting height of a portion corresponding to the release film-second extension unit 214 of the protector film assembly 200. The vertical extension unit member 122 may include a protruding piece 124 to be attached to an insertion hole 116a of the frame-second end member 112b of the frame unit 110. Around the insertion hole 116a, a pair of support ribs 116b may be provided to guide the insertion path of the vertical extension unit member 122 and to firmly maintain a position of the vertical extension unit member 122 mounted onto the frame-second end member 112b even after the protruding piece 124 of the vertical extension unit member 122 is inserted into the insertion hole 116a.

The configuration for attaching the vertical extension unit member 122 to the frame unit 110 is not limited as described in the present disclosure, and various configurations capable of firmly coupling the two components to each other may be included in the scope of the present disclosure.

In addition, the frame unit 110 may include at least one first end-first fixing pin 115a, which is installed on the frame-first end member 112c and protrudes upwards, and a first end-second fixing pin 115b, which has a different horizontal cross-section from that of the first end-first fixing pin 115a. Referring to FIG. 1, the horizontal cross-section of the first end-first fixing pin 115a is a quadrangular shape, and the horizontal cross-section of the first end-second fixing pin 115b is a circular shape. However, the shape of the horizontal cross-sections of the first end-first fixing pin 115a and the first end-second fixing pin 115b are not particularly limited thereto. Under the condition that the shape of the cross-section of the first end-first fixing pin 115a is different from that of the first end-second fixing pin 115b, various other shapes of the horizontal cross-sections thereof may be considered.

The inclination-forming fixing unit 120 may include: a pair of second end-side fixing pins 126 installed protruding upwardly from the vertical extension unit member 122, which extends upwardly; and a second end-central fixing pin 127 between the pair of second end-side fixing pins 126.

Here, a recessed groove 126a having a decreasing diameter may be formed at the bottom of each of the second end-side fixing pins 126.

As shown in FIG. 1, each of the second end-side fixing pins 126 may have a division groove 126b extending from the top to the bottom thereof at the center thereof. The second end-central fixing pin 127 may have a division groove extending from the top to the bottom thereof at the center thereof.

FIG. 1 shows, as an example, a configuration in which a first end-fixing pin (115a, 115b) is provided in a pair, the second end-side fixing pin 126 is provided in a pair, and a single second end-central fixing pin 127 is provided between the pair of second end-side fixing pins 126. However, the configuration is merely an example, and the numbers of each component are not necessarily limited thereto.

The frame unit 110 may include: the seating surface 114 extending horizontally inward in contact with an inner circumference of the seating space 113 toward the seating space 113, in which an electronic device having a width of w1 and a length h1 is placed; and a plurality of support protrusions 114a and 114b formed protruding from a periphery of the seating surface 114, wherein each of the plurality of support protrusions 114a and 114b may be spaced apart from each other on the seating surface 114.

A spacing between the support protrusion 114a and another support protrusion adjacent thereto toward the frame-first end member 112c is defined as h3, and a spacing between the support protrusion 114a and another support protrusion adjacent thereto toward the frame-second end member 112b is defined as h2. Here, h3 is formed to be greater than h2, and a folding recess 320 (see FIGS. 3 and 4) of the foldable display unit of the foldable electronic device may be between the spacing h2. The reason why h2 is less than h3 is to prevent a phenomenon that the foldable electronic device is folded and closed along the folding recess 320 when the display protector body 220 is attached to the folding recess 320 and a pressing force is applied thereto by an operator.

In addition, the foldable electronic device to be placed in the seating space 113 for attachment of the display protector body 220 thereto may be placed in a way that the display unit thereof faces the +z direction in FIG. 1. Here, the side and rear surfaces of the foldable electronic device may be mounted in contact with the support protrusion 114a.

Figure 3:
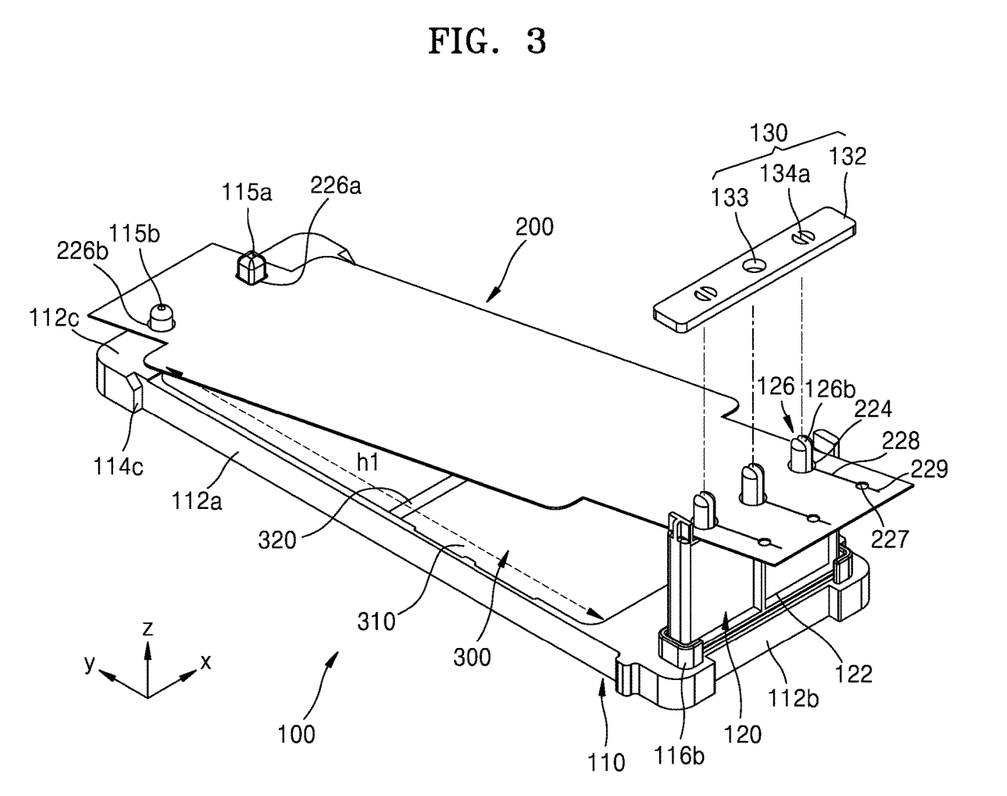
FIG. 3 is a perspective view illustrating a state in which a foldable electronic device including a foldable display unit is arranged on a display protector attachment apparatus for a foldable electronic device including a foldable display unit according to an embodiment of the present disclosure.
Figure 4:
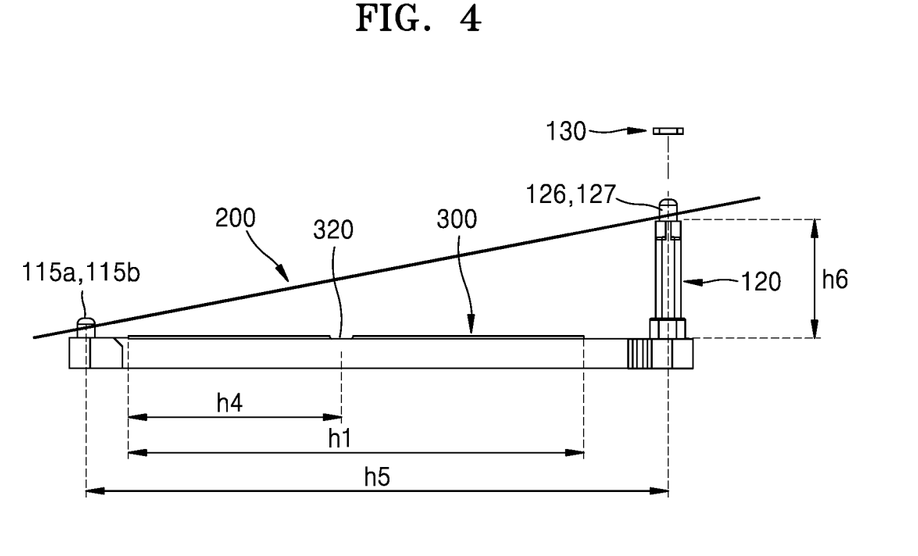
FIG. 4 is a front view in the x-axis direction of FIG. 3.

FIG. 3 is a perspective view illustrating a state in which a foldable electronic device including a foldable display unit is placed on the display protector attachment apparatus 100 for a foldable electronic device including a foldable display unit that folds up and down, and FIG. 4 is a front view in the x-axis direction of FIG. 3.

Referring to FIG. 3, a foldable electronic device 300 is seated in the seating space 113 of the display protector attachment apparatus 100 in which the inclination-forming fixing unit 120 is coupled to the frame unit 110, and the protector film assembly 200 is located to be inclined and spaced apart from the foldable electronic device 300.

A folding recess 320 may be formed in a folding portion of a display unit 310 of the foldable electronic device 300. Here, the inclination-forming fixing unit 120 of the display protector attachment apparatus 100 may extend in parallel to the extending direction (x-axis direction in FIG. 3) of the folding recess 320 in the foldable display unit 310 of the foldable electronic device 300. Accordingly, in either case of an electronic device in which a display unit thereof folds in the up or down direction or an electronic device in which a display unit thereof folds in the right and lift direction, the inclination-forming fixing unit 120 may be arranged considering the folding direction of the foldable electronic device within the seating space 113.

As shown in FIGS. 1 and 3, the display protector attachment apparatus 100 for a foldable electronic device including a foldable display unit according to an embodiment of the present disclosure may include a cover member 130 one end of the protector film assembly 200 so that one end of the protector film assembly 200 may be maintained in a horizontal plane when one end thereof that is placed higher than another end thereof is connected to the inclination-forming fixing unit 120.

The cover member 130 may include pin through holes 134 (see FIG. 7) formed corresponding to the second end-side fixing pin 126 and the second end-central fixing pin 127 of the inclination-forming fixing unit 120. The pin through hole 134 corresponding to the second end-side fixing pin 126 may have a division bar 134a formed at a position corresponding to the division groove 126b, and thus, when the second end-side fixing pin 126 is inserted into the cover member 130, the cover member 130 may firmly support the release film-second extension unit 214.

As shown in FIG. 1, the first end-first fixing pin 115a and the first end-second fixing pin 115b, which are formed on and protrude from the frame-first end member 112 of the frame unit 110 in the display protector attachment apparatus 100, may be spaced apart from each other at a predetermined interval d3 between the centers thereof. In addition, on the upper surface of the inclination-forming fixing unit 120 coupled to the frame-second end member 112b of the frame unit 110, two second end-side fixing pins 126 may be spaced apart from each other at a predetermined interval d0. Also, in a cover strip 132 (see FIG. 3) of the cover member 130, two outermost pin through holes 134 may be apart from each other at a predetermined interval predetermined interval d2, and a spacing between a central through hole, which is between the two outermost pin through holes 134, and each of the two outermost pin through holes 134 is defined as a predetermined interval d1.

In response thereto, as shown in FIG. 2, in the release film-first extension unit 216 of the release film 210 in the protector film assembly 200, two holes, i.e., a first end-first through hole 226a and a first end-second through hole 226b, may be apart from each other at a predetermined interval d5 between the centers thereof. In the release film-second extension unit 214, three second extension unit-first through holes 224 may be formed in a way that a spacing between the centers of two outermost second extension unit-first through holes 224 is a predetermined interval d4, and a spacing between the centers of a second extension unit-first through hole, which is between the two outermost second extension unit-first through holes, and each of the two outermost second extension unit-first through holes is defined as a predetermined interval d6.

The first end-first fixing pin 115a of the display protector attachment apparatus 100 is inserted into the first extension unit-first through hole 226a of the protector film assembly 200, and thus, the first extension unit-first through hole 226a may have a complementary shape and diameter through which the first end-first fixing pin 115a may penetrate. The first end-second fixing pin 115b of the display protector attachment apparatus 100 is inserted into the first extension unit-second through hole 226b of the protector film assembly 200, and thus, the first extension unit-second through hole 226b may have a complementary shape and diameter through which the first end-second fixing pin 115b may penetrate.

As shown in FIGS. 2 and 3, the release film-second extension unit 214 may include a second extension unit-second through hole 227 that is arranged and apart from the second extension unit-first through hole 224 in the longitudinal direction of the release film 210. The second extension unit-second through hole 227 may prevent the release film-second extension unit 214 from being lifted in the last process of attaching the protector film assembly 200.

Moreover, the release film-second extension unit 214 may include, on the circumferential surface of the second extension unit-first through hole 224, an extension unit-first incision line 228 that is formed extending in a direction opposite to the direction in which the release film-first extension unit 216 is located. The extension unit-first incision line 228 may be formed in contact with the circumferential surface of the second extension unit-second through hole 227 from the circumferential surface of the second extension unit-first through hole 224. The extension unit-first incision line 228 may be opened by the second end-side fixing pin 126 and the second end-central fixing pin 127 that correspond to a tensile force applied to the body of the release film 220.

Referring to FIG. 2, the release film-second extension unit 214 may additionally include, on the circumferential surface of the second extension unit-second through hole 227, an extension unit-second incision line 229 that is formed extending in a direction (−y direction) opposite to the direction in which the release film-first extension unit 216 is located.

As described above, because the horizontal cross-sections of the first end-first fixing pin 115a and the first end-second fixing pin 115b are different from each other, when the first extension unit-first through hole 116a→226a and the first extension unit-second through hole 116b→226b of the protector film assembly 200 correspond to the first end-first fixing pin 115a and the first end-second fixing pin 115b, respectively, the possibility of misinstallation may be prevented so that an operator may clearly recognize the corresponding relationship.

Similarly, based on that the second end-side fixing pins 126 and the second end-central fixing pin 127 of the display protector attachment apparatus 100 are each inserted into the second extension unit-first through hole 224 of the protector film assembly 200, the second extension unit-first through hole 224 may have a complementary size through which the second end-side fixing pins 126 and the second end-central fixing pin 127 may pass. Here, as shown in FIG. 2, the second extension unit-first through hole 224 of the protector film assembly 200 may be formed in an elliptical shape having a long axis in the x direction and a minor axis in the y direction. As the second extension unit-first through hole 224 is formed in an elliptical shape, a force applied to the protector film assembly 200 may be naturally distributed in the initial process of attaching the protector film assembly 200 in a state in which the release film-second extension unit of the protector film assembly is inserted into the inclination-forming fixing unit 120 corresponding to the second end-side fixing pins 126 and the second end-central fixing pin 127 of the inclination-forming fixing unit 120.

As shown in FIG. 1, at both ends of the vertical extension unit member 122 of the inclination-forming fixing unit 120, a pair of side protrusions 121 each protruding above the upper surface 123 may be formed.

When the release film-second extension unit 214 of the protector film assembly 200 is arranged on the inclination-forming fixing unit 120, the side protrusion 121 may secure a certain height and space for coupling the release film-second extension unit 214. Also, when a tensile force is applied to the protector film assembly 200, the side protrusion 121 may maintain the tensile force applied to the protector assembly 200 constant.

The second end-side fixing pins 126 and the second end-central fixing pin 127 of the inclination-forming fixing unit 120 may each be inserted into the pin through holes 134 of the cover member 130, and thus, the pin through hole 134 may have a complementary diameter through which the second end-side fixing pins 126 and the second end-central fixing pin 127 may pass.

Considering the mutual coupling relationship, the interval d3 between the centers of the first end-first fixing pin 115a and the first end-second fixing pin 115b of the display protector attachment apparatus 100 may be set to be equal to the interval d5 between the centers of the first extension unit-first through hole 226a and the first extension unit-second through hole 226b of the release film in the protector film assembly 200. Similarly, the interval d0 between the pair of second end-side fixing pins 126 of the display protector attachment apparatus 100 may be set to be equal to the interval d4 between the two outermost second extension unit-second through holes 224 of the release film in the protector film assembly 200 and to the interval d2 between the two outermost pin through holes 134 of the cover member 130.

As shown in FIGS. 3 and 4, after the electronic device 300 is placed on the display protector attachment apparatus 100, the protector film assembly 200 may be located inclinedly over the display protector attachment apparatus 100 and the ends of the protector film assembly 200 may be fixed. On the release film-second extension unit 214 of the protector film assembly 200, the cover member 130 may be located to cover at least a portion of the release film-second extension unit 214.

Referring to FIG. 4, because a folding recess 320 is formed at a predetermined position, for example, in the middle portion, of the foldable electronic device 300 having a length h1 in an unfolded state, a length h4 from the middle portion of the folding recess 320 to the one end of the foldable electronic device 300 is half of the total length h1 of the foldable electronic device 300.

Moreover, the vertical extension member 122 of the inclination-forming fixing unit 120 in the display protector attachment apparatus 100 protrudes upwardly to a height of h6. The distance from the center of the first extension unit-first through hole 226a (i.e., the center of the first end-first fixing pin 115 of the frame unit 110) of the release film 210 in the protector film assembly 200 to the center of the second end-side fixing pin 126 (i.e., the center of the second extension unit-second through hole 224 of the release film-second extension unit 214) of the inclination-forming fixing unit 120 is defined as h5.

In this length relationship, the angle of inclination at which the protector film assembly 200 is placed on the display protector attachment apparatus 100 may be determined such that a tangent value of the corresponding tilt angle is h6/h5. When the angle of inclination is too large, the attachment of a protector to the surface of the foldable display unit of the foldable electronic device 300 by pressing the protector film assembly 200 from above is difficult due to the limitation of elasticity of the release film 210 itself, and the size of the inclination-forming fixing unit 120 increases, causing problems in packaging. On the other hand, when the angle of inclination is too small, the function of attaching a protector in close contact with the folding recess 320 may not be properly implemented and air bubbles are generated between the protector and the foldable display unit of the foldable electronic device.

The inventors of the present disclosure performed a number of experiments to obtain an optimal h6/h5 value. Considering the size of the foldable electronic device 300, h5 was set to 206.74 mm, and h6 was set to 20 mm, 30 mm, 40 mm, 60 mm, and 80 mm. Here, in a case where h6 was 20 mm and 30 mm, a protector and a foldable display unit of the foldable electronic device 300 may be in contact in advance when the protector is attached to the foldable display unit of the foldable electronic device 300, or due to a small binding angle between the protector and the foldable display unit of the foldable electronic device 300, air bubbles generated therebetween.

However, in a case where h6 is 40 mm, 60 mm, and 80 mm, a foldable display unit of the foldable electronic device 300 may not be in contact in advance when the protector is attached to the foldable display unit of the foldable electronic device 300 and air bubbles did not generate therebetween. That is, h6/h5 at which air bubbles are not generated between the protector and the foldable display unit of the foldable electronic device 300 is 40 mm/206.74 mm or more. In other words, the tangent value for the angle of inclination formed by the inclination-forming fixing unit 120 may be 40 mm/206.74 mm or more. Considering the size of packaging and the release film 210, the tangent value may preferably be 80 mm/206.74 mm or less.

On the other hand, in a case where h6 is 80 mm or more, the height of the inclination-forming fixing unit 120 increases, causing problems in packaging of the display protector attachment kit. Therefore, the tangent value (h6/h5) for the angle of inclination formed by the inclination-forming fixing unit 120 may more preferably be 40 mm/206.74 mm.

Figure 5:
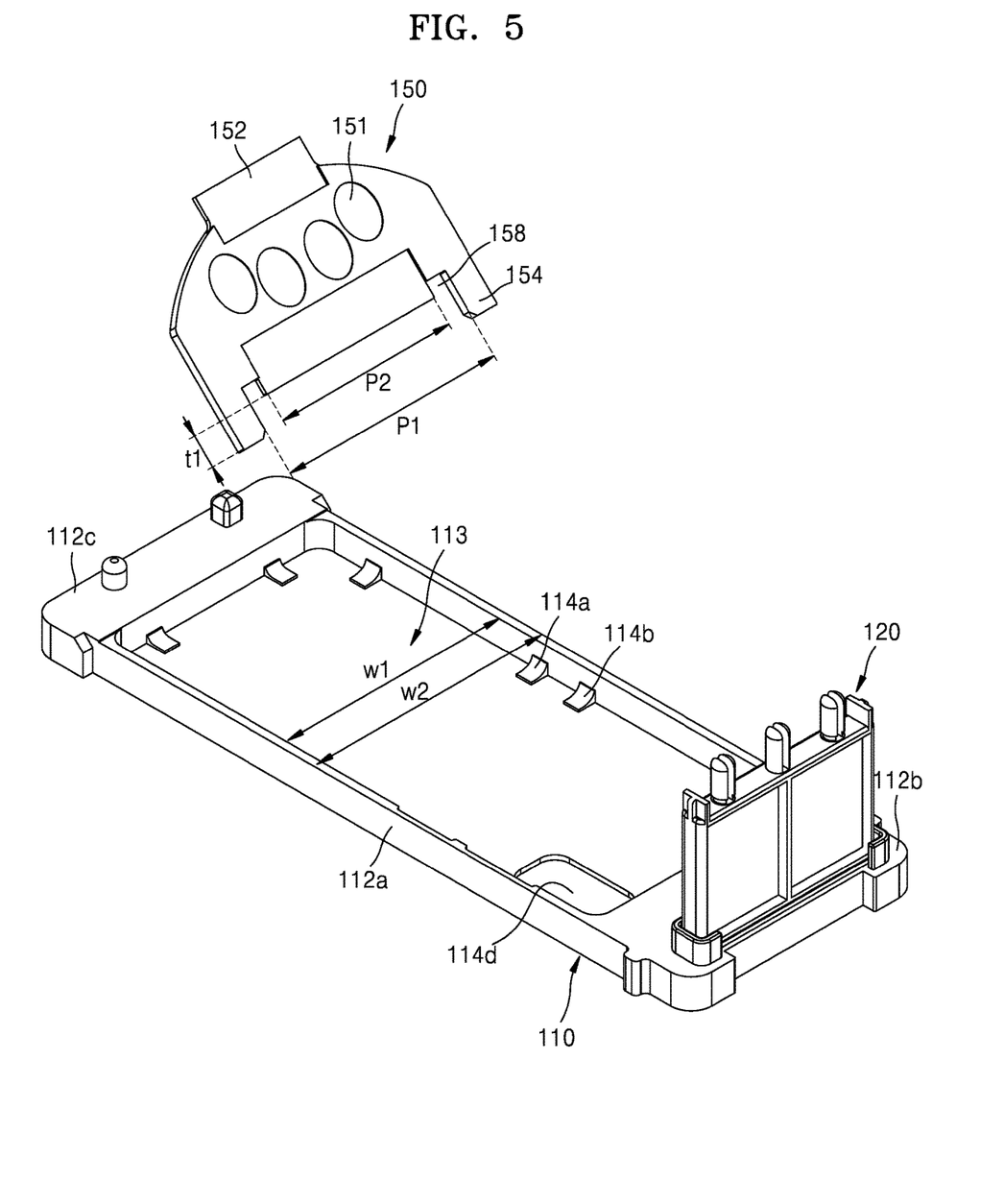
FIG. 5 is an exploded perspective view of a squeeze member included in a display protector attachment kit for a foldable electronic device including a foldable display unit according to an embodiment of the present disclosure.
Figure 6:
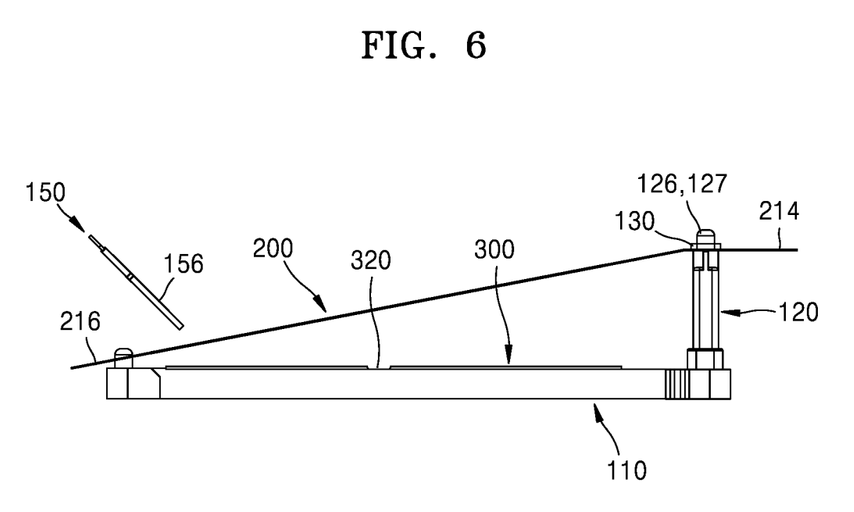
FIG. 6 is a diagram illustrating a state in which a protector is attached to an electronic device by using a squeeze member while a protector film assembly is mounted on a display protector attachment apparatus for a foldable electronic device including a foldable display unit, in the front view of FIG. 4.

FIG. 5 is an exploded perspective view of a squeeze member included in a display protector attachment kit for a foldable electronic device including a foldable display unit according to an embodiment of the present disclosure, and FIG. 6 is a diagram illustrating a state in which a protector is attached to an electronic device by using a squeeze member while a protector film assembly is mounted on a display protector attachment apparatus for a foldable electronic device including a foldable display unit, in the front view of FIG. 4.

Referring to FIGS. 5 and 6, the display protector attachment kit according to an embodiment of the present disclosure may include: the display protector attachment apparatus 100 for a foldable electronic device; the protector film assembly 200 to be attached to the foldable display unit of the foldable electronic device by the display protector attachment apparatus 100; and a squeeze member 150 for sliding the protector film assembly 200 to the foldable display unit of the foldable electronic device.

The squeeze member 150 may include: a blade unit 156 configured to press the protector film assembly 200 against the foldable display unit of the foldable electronic device 300 and extend in a length corresponding to the width of the foldable display unit of the foldable electronic device; and a wing 154 extending from a side surface of the squeeze member 150, arranged at each of both ends of the blade unit 156 to extend from the side surface of the squeeze member 150, wherein a groove 158 having a width greater than a thickness (half of P1-P2 in FIG. 5) of the frame side member 112a of the frame unit 100 is in both ends of the blade unit 156 and between the blade unit 156 and the squeeze member 150.

The wing 154 may be formed in a way that an end thereof extends further downward by t1 than the blade unit 156. Therefore, when a user holds a handle 152 of the squeeze member 150 with the hand and slides the squeeze member 150 while pressing the squeeze member 150 toward the upper surface of the protector film assembly 200 (i.e., the upper surface of the release film 210), as shown in FIG. 6, due to the compression force of the blade unit 156 of the squeeze member 150, the release film 210 of the protector film assembly 200 of which the two ends are fixed may elongate in the longitudinal direction of the release film 210, thereby being in contact with the foldable display unit of the foldable electronic device. Here, due to the compression force by the blade unit 156, the protector body 220 may be tightly attached even to the folding recess 320 of the foldable electronic device 300 along the recessed profile.

The handle 152 may be covered with a non-woven fabric not only to prevent slipperiness, but also to be in close contact with the edge of the display unit when sliding the display unit using the handle 152.

A finger seating hole 151 may be provided under the handle 152 to accommodate the tip of the fingers of an operator. Intervals and positions between the finger seating holes 151 may be arranged considering ergonomics. When the fingers of an operator are inserted into the finger seating holes 151, the operator may guide the fingers upon the attachment of the protector film assembly 200, and the force applied by the squeeze member 150 may be distributed.

As described above with reference to FIGS. 2 and 3, the release film-second extension unit 214 may include, on the circumferential surface of the second extension unit-first through hole 224, the extension unit-first incision line 228 that extends in a direction opposite to the direction in which the release film-first extension 216 is located, and is formed until the circumferential surface of the second extension unit-second through hole 227.

The extension unit-first incision line 228 may be formed between the second extension unit-first through hole 224 and the second extension unit-second through hole 227. The length of the extension unit-first incision line 228 may be set considering the length at which the release film 210 is stretched when the protector film assembly 200 is attached to the foldable display unit of the foldable electronic device, that is, the electronic device 300, using the squeeze member 150 considering the elongation rate of the release film 210.

Therefore, as shown in FIGS. 3 and 6, the extension unit-first incision line 228 may be set to be opened by the second end-side fixing pin 126 and the second end-central fixing pin 127 when a tensile force is applied to the release film body by the squeeze member 150. In this process, because the cover member 130 is coupled to the second end-side fixing pin 126 and the second end-central fixing pin 127, the formation of wrinkles may be prevented in the release film-second extension unit 214. Therefore, the protector may be attached to the foldable display unit of the foldable electronic device while maintaining the release film-second extension unit 225 in a flat state. Because wrinkles are not formed in the release film-second extension unit, the protector may be aligned at an accurate position of the foldable display unit of the foldable electronic device 300.

Figure 7:
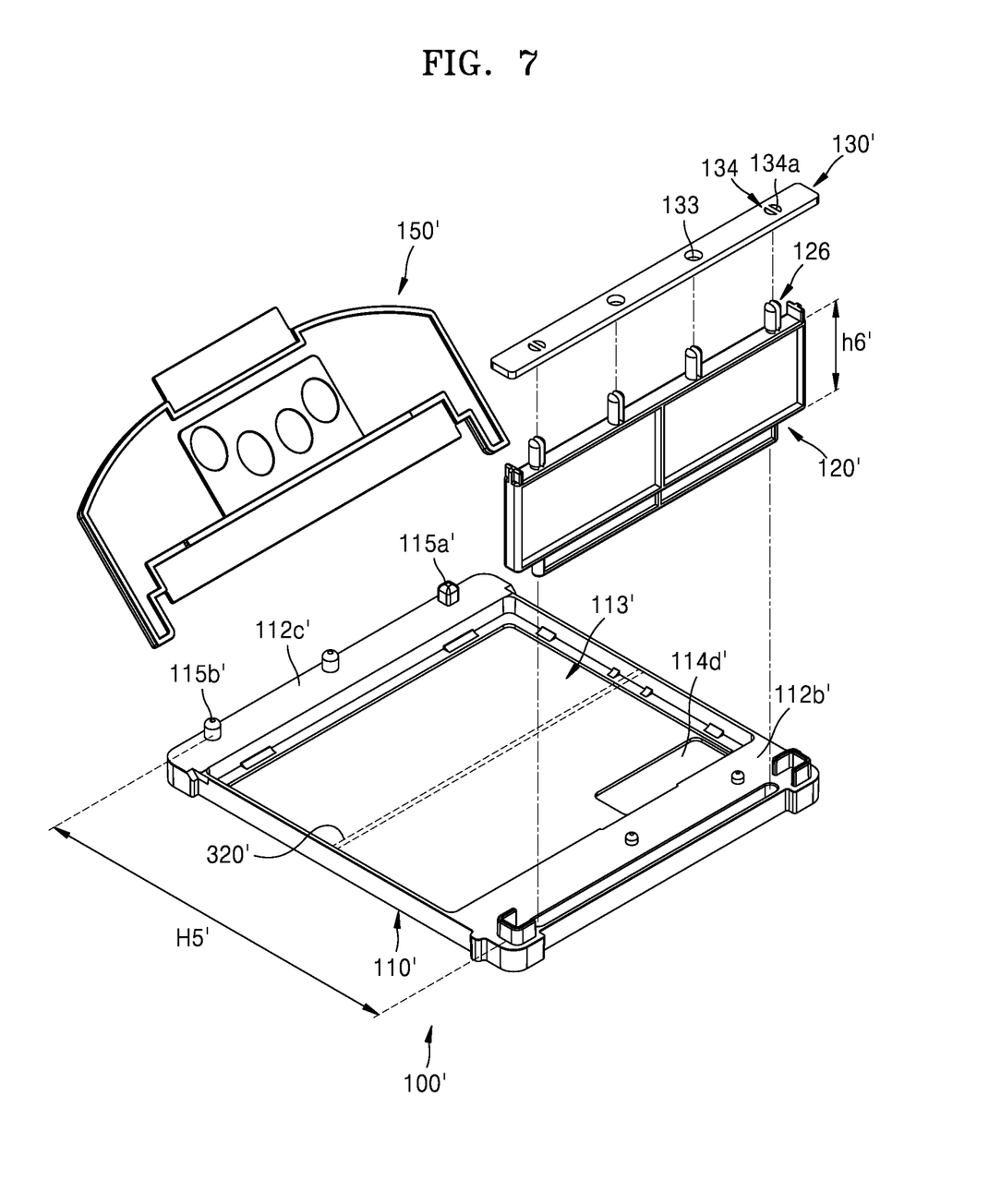
FIG. 7 is an exploded perspective view of a display protector attachment kit for a foldable electronic device that is folded from side to side according to another embodiment of the present disclosure.

FIG. 7 is an exploded perspective view of a display protector attachment kit for a foldable electronic device that folds from side to side according to another embodiment of the present disclosure. In FIG. 7, the same reference numerals are used to denote the same components as those shown in FIGS. 1 to 6 described above, and the corresponding components are denoted by reference numerals by adding a prime symbol thereto. Duplicate descriptions of the same components as those shown will be omitted.

As an example of a foldable electronic device having a foldable display unit that folds from side to side, a smartphone manufactured by Samsung Electronics (the Galaxy Fold®) may be considered. A folding line of the foldable display unit that folds from side to side may extend in a vertical direction of the display unit.

The configuration that an inclination-forming fixing unit 120' extends in parallel to an extension direction of a folding recess 320' of a foldable electronic device having a foldable display unit that folds from side to side is the same as in the case of the embodiments shown in FIGS. 1 to 6.

The size of a seating space 113' may also be formed corresponding depending on the width and height of the external appearance of the foldable electronic device. In a foldable electronic device having a foldable display unit that folds from side to side, the length of the folding recess 320' may be set to be larger than that of the embodiment shown in FIGS. 1 to 6. Therefore, the number of fixing pins and/or the intervals between the fixing pins installed on and protruding from a frame-first end member 112c' may be increased, compared to the embodiment shown in FIGS. 1 to 6. Similarly, the number of fixing pins and/or the intervals of the fixing pins installed on an inclination-forming fixing unit 120' may be increased, compared to the embodiment shown in FIGS. 1 to 6.

Referring to FIG. 7, when H5' is set to 167.75 mm considering the size of an electronic device and h6' is set to 20 mm, 30 mm, 40 mm, 60 mm, and 80 mm to vary the height of the inclination-forming fixing unit 120', as described in connection with examples of FIGS. 1 to 6, the tangent value (h6'/H5') for the angle of inclination formed by an inclination-forming fixing unit 120' may be preferably greater than or equal to 40 min/167.75 mm and less than or equal to 80 mm/167.75 mm at which air bubbles are not formed.

Figure 8:
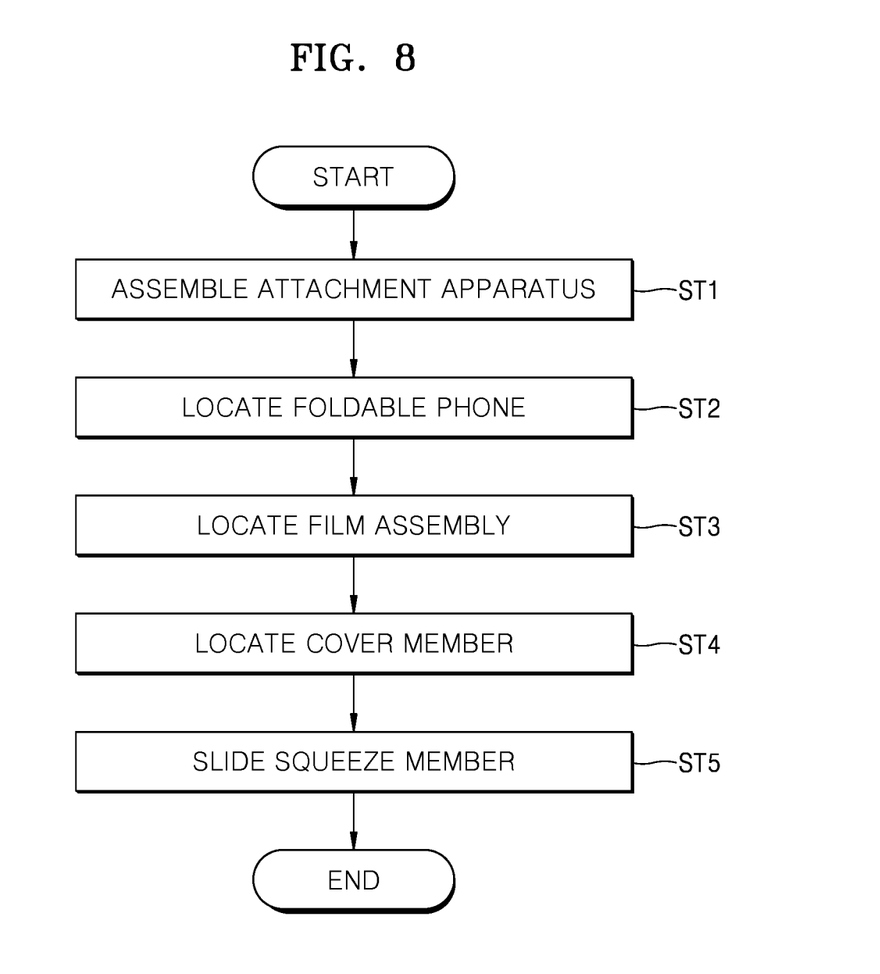
FIG. 8 is a flowchart illustrating a step of attaching a display protector by using a display protector attachment kit for a foldable electronic device including a foldable display unit according to the present disclosure.

FIG. 8 is a flowchart illustrating a process of attaching a protector for a foldable electronic device to a foldable electronic device using the above-described attachment kit.

A protector attachment kit for a foldable electronic device having a foldable display according to an embodiment of the present disclosure may include, in addition to the display protector attachment apparatus 100, the protector film assembly 200 and the squeeze member 150.

First, a user of the display protector attachment kit may assemble the attachment device 110 by coupling the inclination-forming fixing unit 120 to the frame part 110 of the attachment device 100 (ST1). On such an assembled attachment apparatus, a foldable electronic device, for example, a foldable phone, to which a protector is attached may be placed (ST2). Next, the protector film assembly 200 may be located inclinedly to the display protector attachment apparatus 100 and fixed therewith (ST3), and the cover member 130 may cover and fix the release film-second extension unit of the protector film assembly 200 fixed on the inclination-forming fixing unit of the display protector attachment apparatus (ST4). Then, when the squeeze member 150 is pressed with a force while sliding on the upper surface of the protector film assembly 200 (ST5), the protector may be closely attached to the flat portion of the foldable display unit of the foldable electronic device as well as the folding recess 320. Afterwards, when the cover member is released and the release film is removed, the process of attaching the protector to the electronic device is completed.

The disclosed embodiments are to be considered in a descriptive point of view rather than a restrictive sense. The scope of the present disclosure is indicated in the claims rather than the above description, and differences within the scope equivalent thereto should be construed as being included in the disclosure. In the case of a term whose meaning is not specifically defined in the present disclosure, it should be interpreted broadly in its general meaning, and should be interpreted as including other terms in an equivalent range.

According to the one or more embodiments, a display protector attachment apparatus for a foldable electronic device including a foldable display unit and a display protector attachment kit may exhibit the following effects.

First, a display protector may be aligned and attached at an accurate position of a display unit of a foldable electronic device including a foldable display unit.

Second, a display protector for a foldable electronic device of which a display unit is foldable may be attached in close contact with a recess of a folding line of the display unit.

Third, when a release film of a protector film assembly is pulled in the process of attaching a display protector to a display unit of a foldable electronic device, the formation of wavy curves or wrinkles on the release film may be prevented, thereby improving the accuracy of the protector attachment.

Fourth, when a release film of a protector film assembly is pulled in the process of attaching a display protector to a display unit of a foldable electronic device, an incision line may be formed in the extension direction of the release film, thereby exhibiting a predetermined elongation effect of the release film while minimizing the deformation of the release film body.

Fifth, because a display protector attachment kit according to an embodiment of the present disclosure includes a squeeze member for closely attaching a protector film assembly to a display unit of a foldable electronic device, the protector may be closely attached without a gap even to a recess of a folding line formed on a surface of a foldable display unit of a foldable electronic device.

Sixth, because a squeeze member of the display protector attachment kit of the present disclosure includes wings on both sides to slide along the width of a display unit of an electronic device, there is no need to accurately align the squeeze member when the squeeze member is pressed against the display unit.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A display protector attachment apparatus for foldable electronic device having a foldable display unit, the display protector attachment apparatus comprising:
    a frame unit comprising a frame-first end member at one end and a frame-second end member at another end and configured to support and accommodate the foldable electronic device between the frame-first end member and the frame-second end member; and
    an inclination-forming fixing unit connected to the frame-second end member and configured to align a protector film assembly to be arranged inclinedly with respect to the foldable display unit of the foldable electronic device, wherein mounting heights for two opposite ends of the protector film assembly including a display protector that is to be attached to the foldable electronic device are different from each other, and
    wherein the frame unit comprises a first end-first fixing pin and a first end-second fixing pin that are installed on the frame-first end member and protrude upward, wherein the first end-second fixing pin has a different horizontal cross-section from that of the first end-first fixing pin, and
    wherein the inclination-forming fixing unit comprises a pair of second end-side fixing pins installed protruding upwards from a vertical extension unit member that extends upwardly.

2. The display protector attachment apparatus of claim 1, further comprising a cover member covering and pressing one end of the two opposite ends of the protector film assembly to maintain a plane thereof horizontal, wherein the one end of the two opposite ends of the protector film assembly, which is mounted higher than the other end of the two opposite ends, is connected to the inclination-forming fixing unit,
    wherein the cover member comprises a pin through hole formed corresponding to one of the pair of second end-side fixing pins of the inclination-forming fixing unit.

3. The display protector attachment apparatus of claim 2, wherein the frame unit comprises: a seating surface extending horizontally inward along an inner circumference of the frame unit toward a seating space in which the foldable electronic device is placed; and a plurality of support protrusions formed by protruding from a periphery of the seating surface, and
    each of the plurality of support protrusions is spaced apart from the other at a predetermined interval on the seating surface.

4. A display protector attachment kit for a foldable electronic device, the display protector attachment kit comprising:
    the display protector attachment apparatus of claim 1; and
    the protector film assembly to be attached to the foldable display unit of the foldable electronic device by the display protector attachment apparatus,
    wherein the protector film assembly comprises a protector body and a release film attached to one surface of the protector body, and
    the release film includes: a release film-first extension unit formed to extend further than the protector body at one end in a longitudinal direction of the release film; and a release film-second extension unit formed to extend further than the protector body at another end in the longitudinal direction of the release film.

5. The display protector attachment kit of claim 4, wherein the release film-first extension unit includes a release film-first extension unit-first through hole and a release film-first extension unit-second through hole that respectively have a shape complementary to the horizontal cross-sections of the first end-first fixing pin and the first end-second fixing pin on the frame-first end member of the frame unit and are configured to accommodate the first end-first fixing pin and the first end-second fixing pin, respectively, and
    the release film-second extension unit includes: a second extension unit-first through hole configured to accommodate one of the pair of second end-side fixing pins of the inclination-forming fixing unit; and a second extension unit-second through hole spaced apart from the second extension unit-first through hole in a direction toward the end of the release film-second extension unit.

6. The display protector attachment kit of claim 5, wherein the release film-second extension unit further includes, on the circumferential surface of the second extension unit-first through hole, an extension unit-first incision line formed extending in a direction opposite to the direction in which the release film-first extension unit is located.

7. The display protector attachment kit of claim 6, wherein the extension unit-first incision line is formed extending between the circumferential surface of the second extension unit-first through hole and the circumferential surface of the second extension unit-second through hole.

8. The display protector attachment kit of claim 7, wherein the extension unit-first incision line is to be opened by one of the pair of second end-side fixing pins when a tensile force is applied to a body of the release film.

9. The display protector attachment kit of claim 4, further comprising a squeeze member configured to apply a force to the protector film assembly to separate the display protector from the release film of the protector film assembly,
    wherein the squeeze member comprises:
    a blade unit configured to press the protector film assembly against the foldable display unit of the foldable electronic device; and
    a wing extending from a side surface of the squeeze member, arranged at each of both ends of the blade unit to extend from the side surface of the squeeze member, wherein a groove unit having a width greater than a thickness of a frame side member of the frame unit is in both ends of the blade unit and between the blade unit and the squeeze member.

* * * * *